United States Patent [19]
Bahl et al.

[11] Patent Number: 5,970,239
[45] Date of Patent: Oct. 19, 1999

[54] APPARATUS AND METHOD FOR PERFORMING MODEL ESTIMATION UTILIZING A DISCRIMINANT MEASURE

[75] Inventors: Lalit Rai Bahl, Amawalk; Mukund Padmanabhan, Ossining, both of N.Y.

[73] Assignee: International Business Machines Corporation, Armonk, N.Y.

[21] Appl. No.: 08/908,120

[22] Filed: Aug. 11, 1997

[51] Int. Cl.$^6$ .................................................. G06F 9/455
[52] U.S. Cl. ...................... 395/500.23; 704/231; 704/236
[58] Field of Search ............................ 364/578; 704/231, 704/236

[56] References Cited

U.S. PATENT DOCUMENTS

| | | | |
|---|---|---|---|
| 5,195,167 | 3/1993 | Bahl et al. | 395/2 |
| 5,222,146 | 6/1993 | Bahl et al. | 381/41 |
| 5,455,889 | 10/1995 | Bahl et al. | 395/2.45 |
| 5,497,447 | 3/1996 | Bahl et al. | 395/2.54 |
| 5,615,299 | 3/1997 | Bahl et al. | 395/2.63 |
| 5,787,394 | 7/1998 | Bahl et al. | 704/238 |

OTHER PUBLICATIONS

L.R. Bahl, P.F. Brown, P.V. deSouza, R.L. Mercer in "Maximum Mutual Information Estimation of Hidden Markov Model Parameters for Speech Recognition", Proceedings of the ICASSP, pp. 49–52, 1986.

B.H. Juang, W. Chou, C.H. Lee in "Minimum Classification Error Rate Methods for Speech Recognition", IEEE Trans. on Speech and Audio Processing, vol. 5, pp. 257–265, May 1997.

A.P. Dempster, N.M. Laird, D.B. Rubin in "Maximum Likelihood Estimation from Incomplete Data via the EM Algorithm", Journal of the Royal Statistical Society (B), vol. 39, No. 1, pp. 1–38, 1979.

R.O. Duda and P.E. Hart in "Pattern Classification and Scene Analysis", Wiley, New York, 1973.

R. Lippman in "Pattern Classification Using Neural Networks", IEEE Communications Magazine, pp. 11:47–64, 1989.

Y. Normandin in "Optimal Splitting of HMM Gaussian Mixture Components with MMIE Training", Proceedings of the ICASSP, pp. 449–452, 1995.

A.J. Viterbi in "Error Bounds for Convolutional Codes and An Asymptotically Optimum Decoding Algorithm", IEEE Trans. on Information Theory, vol. IT–13, pp. 260–269, Apr. 1967.

*Primary Examiner*—Kevin J. Teska
*Assistant Examiner*—Samuel Broda
*Attorney, Agent, or Firm*—F. Chau & Associates, LLP

[57] ABSTRACT

Method for performing acoustic model estimation to optimize classification accuracy on speaker derived feature vectors with respect to a plurality of classes corresponding to phones to which a plurality of acoustic models respectively correspond comprises: (a) initializing an acoustic model for each phone; (b) evaluating the merit of the acoustic model initialized for each phone utilizing an objective function having a two component discriminant measure capable of characterizing each phone whereby a first component is defined as a probability that the model for the phone assigns to feature vectors from the phone and a second component is defined as a probability that the model for the phone assigns to feature vectors from other phones; (c) adapting the model for selected phones so as to increase the first component for the phone or decrease the second component for the phone, the adapting step yielding a new model for each selected phone; (d) evaluating the merit of the new models for each phone adapted in step (c) utilizing the two component measure; (e) comparing results of the evaluation of step (b) with results of the evaluation of step (d) for each phone, and if the first component has increased or the second component has decreased, the new model is kept for that phone, else the model originally initialized is kept; (f) estimating parameters associated with each model kept for each phone in order to optimize the function; and (g) evaluating termination criterion to determine if the parameters of the models are optimized.

23 Claims, 2 Drawing Sheets

5,970,239

APPARATUS AND METHOD FOR PERFORMING MODEL ESTIMATION UTILIZING A DISCRIMINANT MEASURE

BACKGROUND OF THE INVENTION

The present invention relates to model estimation and, more particularly, to apparatus and methods for performing model estimation utilizing a discriminant measure which enables the design of classifiers to optimize classification accuracy.

In a general classification problem with N classes, the training procedure involves constructing models for each of the N classes using samples of data points from each of these classes. Subsequently, these models are used to classify an incoming test data point by evaluating its "closeness" to each of the N models. There are several possible categories of models that are often used, for instance, linear discriminants (as disclosed by P. O. Duda and P. E. Hart in "Pattern Classification and Scene Analysis", Wiley, New York, 1973), neural networks (as disclosed by R. Lippman in "Pattern Classification Using Neural Networks", IEEE Communications Magazine, pp. 11:47–64, 1989) and gaussian mixtures. The training procedure usually involves selecting a category of model (including its size), and then adjusting the parameters of the model to optimize some objective function on the training data samples. The first step of the training procedure, which involves choosing the type and size of the model, is generally done in an ad-hoc fashion, but more recently, some objective criteria have been introduced as an alternative (e.g., as disclosed by Y. Normandin in "Optimal Splitting of HMM Gaussian Mixture Components with MMIE Training", Proceedings of the ICASSP, pp. 449–452, 1995). The second step of the training procedure involves training the parameters of the model. Several objective functions have been developed in the past to do this, the most commonly used ones being (i) maximizing the likelihood of the data points given the correct class (as disclosed by A. P. Dempster, N. M. Laird, D. B. Rubin in "Maximum Likelihood Estimation from Incomplete Data", Journal of the Royal Statistical Society (B), vol. 39, no. 1, pp. 1–38, 1979) or (ii) maximizing the likelihood of the correct class given the data points (as disclosed by L. R. Bahl, P. F. Brown, P. V. de Souza, R. L. Mercer in "Maximum Mutual Information Estimation of Hidden Markov Model Parameters for Speech Recognition", Proceedings of the ICASSP, pp. 49–52, 1986 and as disclosed by B. H. Juang, W. Chou, C. H. Lee in "Minimum Classification Error Rate Methods for Speech Recognition", IEEE Trans. Speech and Audio Processing, vol. 5, pp. 257–265, May 1997).

When modelling data samples corresponding to a class with, for example, a mixture of gaussians, the parameters of the model are the number of mixture components and the means, variances and priors distributions of these components. In general, the number of mixture components is chosen using some simple ad-hoc rule subject to very loose constraints; for instance the number of components has to be sufficient to model the data reasonably well but not so many as to overmodel the data. A typical example of the choice of the number is to make it proportional to the number of data samples. However, such methods may result in models that are sub-optimal as far as classification accuracy is concerned. For instance, if the number of gaussians modelling a class is inadequate, it may result in the class being mis-classified often, and if too many gaussians are chosen to model a class, it may result in the model encroaching upon the space of other classes as well. These two conditions will be referred to as "non-aggressive" and "invasive" models, respectively.

Once the number of mixture components has been decided, the next step is to estimate the means and variances of the components. This is often done so as to maximize the likelihood of the training data samples. Though this necessarily gives the parameters that best fit the model to the data, it may result in a model that encroaches on the sample space of a different class, and hence lead to misclassifications. An alternative to maximum likelihood is maximum mutual information or MMI (as disclosed in the L. R. Bahl article cited above) or minimum classification error or MCE (as disclosed in the B. H. Juang article cited above), where the model parameters are directly estimated to minimize misclassification error. Methods that use such objective functions are called discriminant methods because they try to maximize the discrimination power of the models.

However, it would be advantageous to provide an objective function that can be used to both select an optimum size for the model and to train the parameters of the model which, further, may be applied to any category of classifier with one example being gaussian classifiers. It would also be advantageous to provide a measure that can be used to determine the number of mixture components in order to avoid classes of models characterized as "non-aggressive" and "invasive". It would still further be advantageous to provide an objective function that falls into the category of discriminant objective functions, but differs from MMI and MCE, and that can be used to tune the size of the models as well as estimate the parameters of, for example, the gaussians in the models.

SUMMARY OF THE INVENTION

Before summarizing the invention, the notation employed for describing the invention will be explained.

Notation

The $t^{th}$ training data sample will be denoted $x_t$, and the class it belongs to (this is assumed to be known a-priori) will be denoted $C(x_t)$. The model for class l will be denoted $M_l$; hence, we denote the probability assigned to data sample $x_t$ by model $M_l$ as $p(x_t/M_l)$. Further, as the classifier is generally far from perfect, for any given data sample $x_t$, in general there will be several models in addition to $M_{C(x)_t}$ that give a reasonably high (for instance, greater than a specified threshold) probability to $x_t$. The classes corresponding to these models will be designated as the "confusable" classes for data sample $x_t$ and will be denoted $F(x_t)$; hence, to recapitulate, $C(x_t)$ represents the correct class corresponding to $x_t$ and $F(x_t)$ represents a set of confusable classes for $x_t$.

The discriminant measure provided in accordance with the present invention is a 2-dimensional vector, $d_t$, characterizing every class l. The two components of the vector will be referred to as the "correct probability of the class", $P_c^i$, and the "incorrect probability of the class", $P_i^t$, and are computed as follows. The correct probability for class l is computed from the training data samples that belong to the class l and may be represented as:

$$P_c^l = \frac{1}{T_1} \sum_{t \ni C(x_t)=l} \frac{p(x_t/M_l)}{p(x_t/M_l) + \sum_{j \in F(x_t)} p(x_t/M_j)} \qquad (1)$$

where $T_1$ is a normalizing factor representing the number of training data samples corresponding to the class l.

Similarly, the incorrect probability for class l is computed from training data samples that belong to other classes, but that include l in the confusable list of classes for that data sample and may be represented as:

$$P_i^l = \frac{1}{T_2} \sum_{t \ni l \in F(x_t)} \frac{p(x_t/M_l)}{p(x_t/M_{C(x_t)}) + \sum_{j \in F(x_t)} p(x_t/M_j)} \quad (2)$$

where $T_2$ is a normalizing factor representing the number of training data samples that include l in their list of confusable classes.

Model Complexity Estimation

Clearly, the ideal situation would correspond to the case $d_l=[1\ 0]$ in all l; in this case the model for class l would always give a probability of 1 to data samples that belong to class l, and a probability of 0 to data samples from all other classes. However, this ideal situation is rarely achieved, and in general, the classes are characterized by $P_c^l$ and $P_i^l$ values lying between 0 and 1. However, the following conclusions may be drawn based on these values. If $P_c^l$ is less than or equal to a threshold value (e.g., 0.5), this implies that the model for class l gives data samples belonging to the same class an average probability of less than 0.5 and, therefore, may be categorized as a non-aggressive model. Consequently, it must be the case that the model does not match the data very well, hence, the resolution of the model for the class l must be increased by adding components to its model. If $P_i^l$ is greater than or equal to a threshold value (e.g., 0.5), this implies that this model for class l gives a high probability to data samples from other classes and, therefore, may be characterized as an invasive model. Hence, in order to improve the overall performance of the classifier, the number of components in the model for this class has to be reduced. It is also to be appreciated that a ratio of $P_c^l$ to $P_i^l$ may be calculated and compared to a threshold value in order to determine whether components need to be added or subtracted from the model for a class.

The above two observations form the basis for adapting the size of the model for selected classes using the discriminant measure. Further, this can be done in an iterative fashion.

Parameter Estimation

As the desired value of the discriminant measure for a class is [1 01], an error measure, $e_l$, may be defined as:

$$e_l = [1\ 0] - d_l \quad (3)$$

The parameter of the models can now be optimized to minimize the weighted mean square error over all classes, which may be denoted as:

$$\min \sum_{l=1}^{N} e_l^T W_l e_l \quad (4)$$

where $W_l$ is a positive-definite symmetric matrix. The objective function is a non-linear function of the model parameters, and standard optimization procedures, such as a gradient-descent (as disclosed by D. Luenberger in "Linear and Non-linear Programming", Addison-Wesley Publishing Company, 1984), can be used to optimize the objective function.

In summary, a new discriminant measure is disclosed that measures the "goodness" (merit) of the models of a classifier. Also, objective functions related to this measure are disclosed that can be used to optimize both the model size and its parameters. Further, the discriminant measure can also be used in adapting models to a particular condition, using the adaptation data from that condition.

In one aspect of the present invention, a method for performing model estimation in order to optimize classification accuracy on test data with respect to a plurality of classes to which a plurality of models respectively correspond comprises the steps of: (a) initializing a model for each class; (b) evaluating the merit of the model initialized for each class utilizing an objective function having a two component discriminant measure capable of characterizing each class whereby a first component is defined as a probability that the model for the class assigns to the test data from the class and a second component is defined as a probability that the model for the class assigns to the test data from other classes; (c) adapting the model for selected classes so as to one of increase the first component of the discriminant measure for the class and decrease the second component of the discriminant measure for the class, the adapting step yielding a new model for each selected class; (d) evaluating the merit of the new models for each class adapted in step (c) utilizing the two component discriminant measure; (e) comparing results of the evaluation performed in step (b) with results of the evaluation of step (d) for each class, and if one of the first component of the discriminant measure has increased and the second component of the discriminant measure has decreased, then the new model is kept for that class, else the model originally initialized is kept; (f) estimating parameters associated with each model kept for each class in order to substantially optimize the objective function; and (g) evaluating termination criterion to determine if the parameters of the models are substantially optimized.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

In accordance with the invention, a preferred method for adapting the models consists of the following steps. For the purposes of this detailed description, it is assumed that the training data has been preprocessed such that the correct class and the confusable list of classes are available for all data samples. For the specific case of speech recognition, the classes could correspond to phones, and the data samples to feature vectors that are extracted from a frequency domain description of the speech. The correct class in this case can be obtained by using a dynamic programming technique such as disclosed by A. J. Viterbi in "Error Bounds for Convolutional Codes and An Asymptotically Optimal Decoding Algorithm", IEEE Trans. Information Theory, vol. IT-13, pp. 260–269, April 1967. The list of confusable classes may be obtained in several ways; for instance, by using a speech recognition system to transcribe the data and produce an N-best list. This is generally done by hypothesizing a sequence of words, computing a match between the sequence of words and the stream of feature vectors and picking the highest scoring sequence of words as the decoded utterance. The top N such sequence of words is called the N-best list. It is possible to viterbi align the sequence of feature vectors to each of the sentences in the N-best list to produce the best phone (class) that a feature vector aligns to. Hence, for every feature vector, there is a list of phones that the feature vector has been aligned to based on the different hypotheses of the N-best list. All entries in this list that are not equal to the correct phone make up the confusable list for the feature vector.

Figure 1:
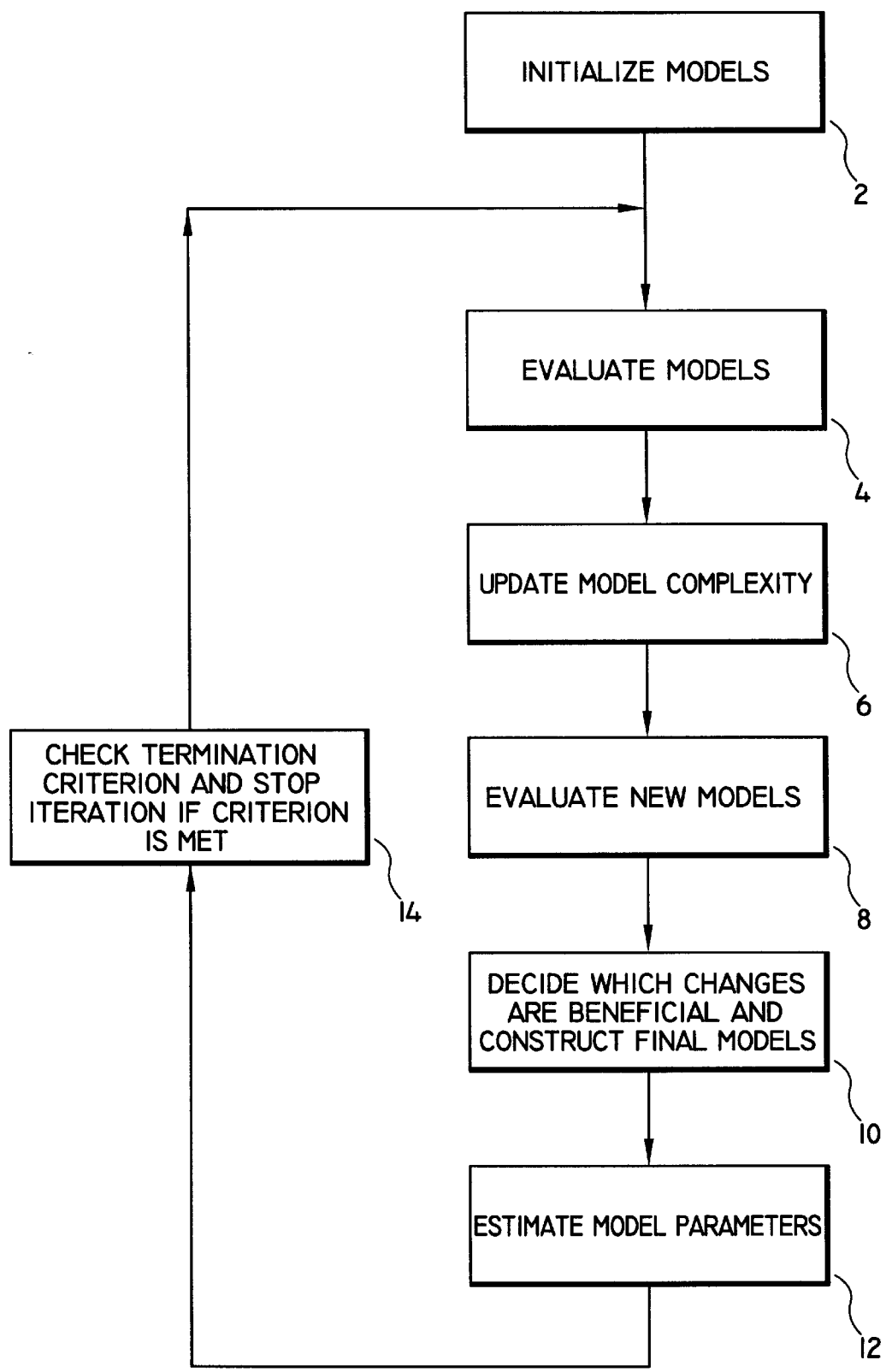
FIG. 1 is a flow chart illustrating a method of performing model estimation utilizing a discriminant measure according to the present invention.

Referring now to FIG. 1, a preferred method of the invention starts with an initial model and adapts the model in every iteration in order to achieve some desired objective. In block 2, the model for each class is initialized (selection of model type, complexity, and initial parameter values). In block 4, the "goodness" of these models is evaluated. In block 6, based on the evaluation of block 4, the complexity of models of some selected classes is updated. In block 8, the new models are evaluated. In block 10, the performance of the new models and the initial models is compared, and a decision is made as to whether the changes that were made to the specific models are beneficial or not; the changes that are beneficial are retained, and the remaining changes are discarded (i.e., the models for these classes backoff to the initial models) and the final set of models is produced. In block 12, the parameters of the final model are estimated using either a maximum-likelihood objective function as disclosed in the Dempster et al. article cited above, or discriminant object functions as respectively disclosed in the Bahl et al. and Juang et al. articles cited above, or preferably, the objective function described in equation (4). Finally, in block 14, the termination criterion of the iterative process is checked, and the process either terminates or continues for another iteration.

A detailed description of the steps of the preferred process will now follow. By way of example and for the purpose of illustration, it is assumed that there are 5 classes, and the model uses mixtures of gaussians to model these classes. These gaussians may be obtained, for instance, by clustering the turning data samples that belong to a class into a pre-determined number of clusters. Again, by way of example and for the purpose of illustration, it is further assumed that the models for the different classes have respectively 10, 8, 6, 7 and 5 mixture components. This defines the initial models (block 1).

The steps involved in block 4 of the preferred method are as follows. Using the initial models (from block 1) and information about the correct and confusable list of classes for each data sample (predetermined), $d_l$ is computed for the classes on the training data. As described above, $d_l$ has two components, $P_c^l$ and $P_i^l$, as respectively defined in equations (1) and (2).

To compute $P_c^l$, those training data samples that belong to the class l are considered. For each such data sample, the likelihood of the data sample given the model for class l, i.e., $p(x_t/M_l)$, is computed, and also the probability of the data sample given the models of the classes in its confusable list, i.e., $p(x_t/M_j)$ where $j \in F(x_t)$, is computed. Subsequently, the correct probability for the data sample is computed as:

$$P_c^l(x_t) = \frac{p(x_t/M_l)}{p(x_t/M_l) + \sum_{j \in F(x_t)} p(x_t/M_j)} \quad (5)$$

This quantity is computed for every data sample belonging to class l (assume that there are $T_1$ such samples), and $P_c^l$ is computed as:

$$P_c^l = \frac{1}{T_1} \sum_{t \ni C(x_t) = l} P_c^l(x_t) \quad (6)$$

Another way to represent $P_c^l$ is as a geometric average representation:

$$P_c^l = \left[ \prod_{t \ni C(x_t) = l} P_c^l(x_t) \right]^{\frac{1}{T_1}} \quad (7)$$

To compute $P_i^l$, the training data samples that include the class l in their list of confusable classes are used (assume that there are $T_2$ such data samples). For each $x_t$ that includes l in its list of confusable classes, as before, the probability of $x_t$ is computed given that model for its correct class, $P(x_t/M_{C(x_t)})$ and given the model for the classes in its confusable list $P(x_t/M_j)$ where $j \in F(x)$. Now l is one of the confusable classes for the data sample, and its probability is computed as:

$$P_i^l(x_t) = \frac{p(x_t/M_l)}{p(x_t/M_l) + \sum_{j \in F(x_t)} p(x_t/M_j)} \quad (8)$$

Summing these terms over all the $x_t$ that include l in their list of confusable classes, and normalizing by $T_2$ yields:

$$P_i^l = \frac{1}{T_2} \sum_{t \ni l \in F(x_t)} P_i^l(x_t) \quad (9)$$

Another way to represent $P_i^l$ is as a geometric average representation:

$$P_i^l = \left[ \prod_{t \ni l \in F(x_t)} P_i^l(x_t) \right]^{\frac{1}{T_2}} \quad (10)$$

At this point, $d_l$ for all classes has been obtained. Again, by way of example and for the sake of illustration, assume that the values are as given in Table 1 (the number of mixture components in the model for each class is also shown in the last column):

TABLE 1

| Class | $P_c^l$ | $P_i^l$ | # number comp |
|---|---|---|---|
| 1 | 0.9 | 0.1 | 10 |
| 2 | 0.45 | 0.4 | 8 |
| 3 | 0.45 | 0.1 | 6 |
| 4 | 0.9 | 0.6 | 7 |

TABLE 1-continued

| Class | $P_c^t$ | $P_i^t$ | # number comp |
|---|---|---|---|
| 5 | 0.5 | 0.5 | 5 |

The next step in the preferred method is to adapt the complexity of the models (block 6). First, the non-aggressive classes (classes that have, for example, $P_c^t \leq 0.5$) are selected. From Table 1, classes 2, 3 and 5 fall into this category. In order to improve the resolution of these models, the number of mixture components for these models are increased (for instance, by increasing the number of mixture components by 5); hence, the models for the classes would now respectively have 10, 13, 11, 7 and 10 mixture components. Next, the invasive classes are determined (classes that have, for example, $P_i^t \geq 0.5$). From Table 1, classes 4 and 5 fall into this category. The invasiveness of these classes is reduced by reducing the number of mixture components in the models for these classes (for instance, by reducing the number of mixture components by 4). Hence, the number of mixture components in the various models after making this adjustment would be 10, 13, 11, 3 and 6. These new models are obtained by reclustering the data samples belonging to the appropriate classes to produce the desired number of mixture components.

In the next step of the preferred method, the new models are now evaluated by obtaining the $d_I$ for the different classes (block 8). By way of example and for the purposes of illustration, assume that the new $d_I$ values are as given in Table 2.

TABLE 2

| Class | $P_c^t$ | $P_i^t$ | # number comp |
|---|---|---|---|
| 1 | 0.88 | 0.1 | 10 |
| 2 | 0.52 | 0.6 | 13 |
| 3 | 0.55 | 0.12 | 11 |
| 4 | 0.85 | 0.45 | 3 |
| 5 | 0.6 | 0.65 | 6 |

It is to be noted that often, if the number of mixture components for a model is increased, the $P_c^t$ as well as the $P_i^t$ of the model both increase; conversely, if the number of mixture components is deceased, both the $P_c^t$ and $P_i^t$ decrease. In the former case, if the increase in $P_c^t$ is much larger than the increase in $P_i^t$, then clearly the change that was made to the model is beneficial. Similarly, if in the latter case, the decrease in $P_i^t$ is much larger than the decrease in $P_c^t$, then the change made to the model is beneficial.

In the next step of the preferred method, these effects which arise from a change of the models in are evaluated (block 10). If the change in $d_I$ for a class whose model was changed is not beneficial, then the change in the model is undone and we backoff (return to) to the initial model for that class. If the change in $d_I$ is beneficial, then the new model for the class is retained. A "beneficial" change in $d_I$ may be defined in several ways, for instance, for models whose resolution has increased, a change in $d_I$ could be defined to be beneficial only if the increase in $P_c^t$ is greater than the increase in $P_i^t$. Similarly, for models whose resolution has decreased, a change in $d_I$ could be defined as beneficial only if the decrease in $P_i^t$ is greater than the decrease in $P_c^t$.

Based on this definition, comparing Tables 1 and 2, it may be concluded that the change in the models for classes 3 and 4 are beneficial, while the changes in the models for classes 2 and 5 are not. Hence, we backoff to the initial models (with 8 and 5 mixture components, respectively) for classes 2 and 5. The final model at the end of this iteration would model the 5 classes with mixtures of 10, 8, 11, 3 and 5 gaussians, respectively.

At this point, the number of parameters in the model has been decided, and the next step of the preferred method is to estimate these model parameters (block 12). The model parameters may be estimated to optimize the objective function in a manner as defined in equation (4). The parameters to be adapted in this case are the means, variances and prior distributions of the mixture components. The objective function of equation (4) is clearly a nonlinear function of these parameters, and nonlinear optimization techniques as disclosed in the Luenberger article cited above (for example, gradient-descent) may be used to obtain these parameter estimates.

In the next step of the preferred method (block 14), the termination criterion of the process is checked to decide whether to terminate the iterative process represented by blocks 2–12, or to continue the process. An example of the termination criterion could preferably be to compare the median value of the $P_c^t$ values to a threshold, and if it is greater than the threshold, the process terminates, and if it is less than the threshold, the process continues onto the next iteration (blocks 4–12) of the process.

It is to be appreciated that the preferred process described in blocks 2–14 was explained in the context of a general classifier problem; however, the same procedure can also be used for adapting the models of the classifier to provide the best performance for a given condition. In the speech recognition context, this would correspond to adapting the models to a particular speaker. In such a situation, exactly the same procedure outlined in FIG. 1 can be followed to adapt the models, the only difference is that the data on which the models are trained $x_t$ now refer to adaptation data that is provided by the speaker.

Furthermore, it is to be understood that apparatus for providing the inventive features of the present invention may include functional modules which respectively perform the steps corresponding to the blocks of the preferred process illustrated and explained in the context of FIG. 1. However, more or less functional modules may be employed. Such functional modules may be implemented in hardware, software or a combination thereof. Preferably, the invention is implemented in software on an appropriately programmed general purpose digital computer.

Figure 2:
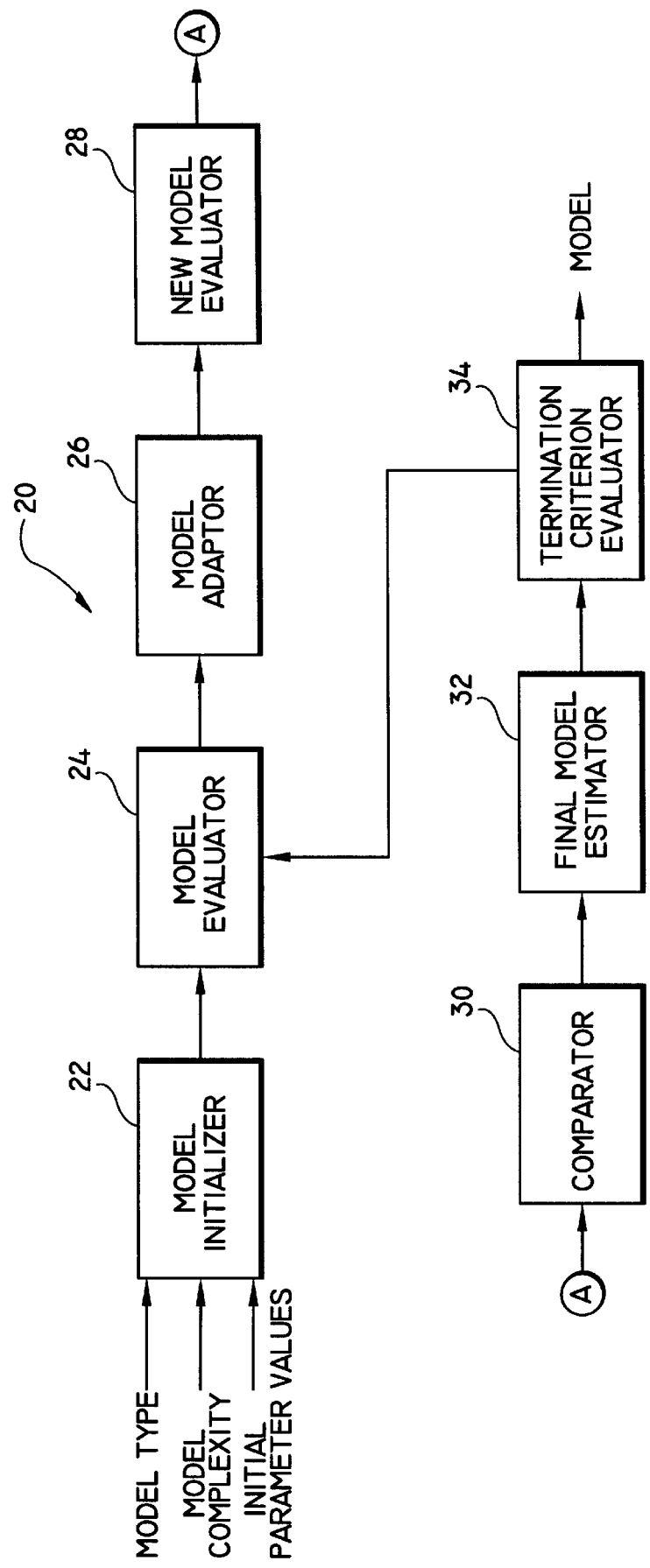
FIG. 2 is a block diagram illustrating apparatus for performing model estimation utilizing a discriminant measure according to the present invention.

Nonetheless, FIG. 2 is a block diagram illustrating a preferred apparatus 20 for performing model estimation utilizing a discriminant measure according to the present invention. The preferred apparatus 20 of the invention starts with an initial model and adapts the model in every iteration in order to achieve some desired objective. A model initializer 22 performs a function similar to the step described above with respect to block 2 of FIG. 1. That is, the model for each class is initialized such that information such as model type, model complexity and initial parameter values are selected. A model evaluator 24, operatively coupled to the initializer 22, performs a similar function to the step described above with respect to block 4 of FIG. 1. That is, the evaluator 24 evaluates the "goodness" (merit) of these models utilizing the two-dimensional discriminant measure described above. A model adaptor 26, operatively coupled to the evaluator 24, performs a similar function as the step described above with respect to block 6 of FIG. 1. That is, based on the evaluation performed by the evaluator 24, the complexity of models of some selected classes is updated by the adaptor 26.

Next, a new model evaluator 28, operatively coupled to the adaptor 26, performs a similar function as the step described above with respect to block 8 of FIG. 1, that is, the new model is evaluated utilizing the two-dimensional discriminant measure described above. A comparator 30, operatively coupled to the new model evaluator 28, performs a similar function to the step 10 described above with respect to block 10 of FIG. 1. That is, the performance of the new models and the initial models is compared by the comparator 30, and a decision is made as to whether the changes that were made to the specific models are beneficial or not; the changes that are beneficial are retained, and the remaining changes are discarded (i.e., the models for these classes backoff to the initial models) and the final set of models is produced. A final model estimator 32, operatively coupled to the comparator 30, performs a similar function to the step described above with respect to block 12. That is, the parameters of the final model are estimated using either a maximum-likelihood objective function as disclosed in the Dempster et al. article cited above, or discriminant object functions as respectively disclosed in the Bahl et al. and Juang et al. articles cited above, or preferably, the objective function described in equation (4). Finally, a termination criterion evaluator 34, operatively coupled to the model evaluator 24 and the final model evaluator 32, performs a similar function as the step described above with respect to block 14, that is, the termination criterion of the iterative process performed by the preferred apparatus is checked, and the process either terminates or continues for another iteration. It is to be appreciated that more detailed and alternative functions described above in relation to the steps of the preferred method may be performed by the related component of the preferred apparatus 20. Also, the apparatus 20 may be used in the specific context of speech recognition, as discussed above.

It is to be appreciated that the test data utilized according to the invention may be in the form of test data signals input to the computer executing the apparatus using conventional input/output devices, e.g., keyboard, etc. In the specific example of speech recognition, the test data which is in the form of feature vector signals is derived from spoken utterances provided by a test speaker and input to the present invention via an audio signal-to-electrical signal transducer (e.g., microphone). As is known in the art, the feature vector signals are generated from the electrical signals which represent the spoken utterances using conventional feature vector extraction techniques. After the estimation and optimization of acoustic models performed according to the invention, as described above, the models and classifier may be used to decode spoken utterances provided in various applications implementing a speech recognizer in an otherwise conventional manner. The decoded utterances may then be output to an electrical signal-to-audio signal transducer (e.g., speaker), a display or to another peripheral device or system depending on the specific application.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for performing acoustic model estimation in order to optimize classification accuracy on feature vectors derived from a speaker with respect to a plurality of classes corresponding to phones to which a plurality of acoustic models respectively correspond, the apparatus comprising:

means for initializing an acoustic model for each class;

first means for evaluating the merit of the acoustic model initialized for each phone utilizing an objective function having a two component discriminant measure capable of characterizing each phone whereby a first component is defined as a probability that the acoustic model for the phone assigns to the feature vectors from the phone and a second component is defined as a probability that the acoustic model for the phone assigns to the feature vectors from other phones;

means for adapting the acoustic model for selected phones so as to one of increase the first component of the discriminant measure for the phone and decrease the second component of the discriminant measure for the phone, the adapting means yielding a new acoustic model for each selected phone;

second means for evaluating the merit of the new acoustic models for each phone adapted by the adapting means utilizing the two component discriminant measure;

means for comparing results obtained by the first evaluating means with results obtained by the second evaluating means for each phone, and if one of the first component of the discriminant measure has increased and the second component of the discriminant measure has decreased, then the new acoustic model is kept for that phone, else the acoustic model originally initialized is kept;

means for estimating parameters associated with each acoustic model kept for each phone in order to substantially optimize the objective function; and third means for evaluating termination criterion to determine if the parameters of the acoustic models are substantially optimized.

2. The apparatus of claim 1, further comprising means for sequentially repeating the functions respectively performed by the first evaluating means, the adapting means, the second evaluating means, the comparing means, the estimating means and the third evaluating means if the termination criterion has not been substantially satisfied.

3. The apparatus of claim 1, wherein the first component of the two component discriminant measure is represented as:

$$P_c^i = \frac{1}{T_1} \sum_{t \ni C(x_t)=l} P_c^i(x_t) \quad (1)$$

where $x_t$ represents the feature vectors and $T_1$ represents a normalizing factor and $P_c^i(x_t)$ is represented as:

$$P_c^i(x_t) = \sum_{t \ni C(x_t)=l} \frac{p(x_t/M_l)}{p(x_t/M_l) + \sum_{j \in F(x_t)} p(x_t/M_j)} \quad (2)$$

where $M_l$ represents the acoustic model for phone l, $M_j$ represents the acoustic model for phone j, $C(x_t)$ represents a correct phone and $F(x_t)$ represents confusable phones.

4. The apparatus of claim 1, wherein the second component of the two component discriminant measure is represented as:

$$P_i^l = \frac{1}{T_1} \sum_{t \ni l \in F(x_t)} P_i^l(x_t) \qquad (3)$$

where $x_t$ represents the feature vectors and $T_2$ represents a normalizing factor and where $P_i^l(x_t)$ is represented as:

$$P_i^l(x_t) = \sum_{t \ni l \in F(x_t)} \frac{p(x_t/M_l)}{p(x_t/M_{C(x_t)}) + \sum_{j \in F(x_t)} p(x_t/M_j)} \qquad (4)$$

wherein $M_l$ represents the acoustic model for phone l, $M_j$ represents the acoustic model for phone j, $C(x_t)$ represents a correct phone and $F(x_t)$ represents confusable phones.

5. A method for performing acoustic model estimation in order to optimize classification accuracy on feature vectors derived from a speaker with respect to a plurality of classes corresponding to phones to which a plurality of acoustic models respectively correspond, the method comprising the steps of:

(a) initializing an acoustic model for each phone;

(b) evaluating the merit of the acoustic model initialized for each phone utilizing an objective function having a two component discriminant measure capable of characterizing each phone whereby a first component is defined as a probability that the acoustic model for the phone assigns to the feature vectors from the phone and a second component is defined as a probability that the acoustic model for the phone assigns to the feature vectors from other phones;

(c) adapting the acoustic model for selected phones so as to one of increase the first component of the discriminant measure for the phone and decrease the second component of the discriminant measure for the phone, the adapting step yielding a new acoustic model for each selected phone;

(d) evaluating the merit of the new acoustic models for each phone adapted in step (c) utilizing the two component discriminant measure;

(e) comparing results of the evaluation performed in step (b) with results of the evaluation of step (d) for each phone, and if one of the first component of the discriminant measure has increased and the second component of the discriminant measure has decreased, then the new acoustic model is kept for that phone, else the acoustic model originally initialized is kept;

(f) estimating parameters associated with each acoustic model kept for each phone in order to substantially optimize the objective function; and (g) evaluating termination criterion to determine if the parameters of the acoustic models are substantially optimized.

6. The method of claim 5, further comprising the step of repeating steps (b) through (g) if the termination criterion has not been substantially satisfied.

7. The method of claim 5, wherein the first component of the two component discriminant measure is represented as:

$$P_c^l = \frac{1}{T_1} \sum_{t \ni C(x_t)=l} P_c^l(x_t) \qquad (5)$$

where $x_t$ represents the feature vectors and $T_1$ represents a normalizing factor and $P_c^l(x_t)$ is represented as:

$$P_c^l(x_t) = \sum_{t \ni C(x_t)=l} \frac{p(x_t/M_l)}{p(x_t/M_l) + \sum_{j \in F(x_t)} p(x_t/M_j)} \qquad (6)$$

where $M_l$ represents the acoustic model for phone l, $M_j$ represents the acoustic model for phone j, $C(x_t)$ represents a correct phone and $F(x_t)$ represents confusable phones.

8. The method of claim 5, wherein the second component of the two component discriminant measure is represented as:

$$P_i^l = \frac{1}{T_2} \sum_{t \ni l \in F(x_t)} P_i^l(x_t) \qquad (7)$$

where $x_t$ represents the feature vectors and $T_2$ represents a normalizing factor and where $P_i^l(x_t)$ is represented as:

$$P_i^l(x_t) = \sum_{t \ni l \in F(x_t)} \frac{p(x_t/M_l)}{p(x_t/M_{C(x_t)}) + \sum_{j \in F(x_t)} p(x_t/M_j)} \qquad (8)$$

where $M_l$ represents the acoustic model for phone l, $M_j$ represents the acoustic model for phone j, $C(x_t)$ represents a correct phone and $F(x_t)$ represents confusable phones.

9. The method of claim 5, wherein the first component of the two component discriminant measure is represented as:

$$P_c^l = \left[ \prod_{t \ni C(x_t)=l} P_c^l(x_t) \right]^{\frac{1}{T_1}} \qquad (9)$$

where $x_t$ represents the feature vectors and $T_1$ represents a normalizing factor and where $P_c^l(x_t)$ is represented as:

$$P_c^l(x_t) = \sum_{t \ni C(x_t)=l} \frac{p(x_t/M_l)}{p(x_t/M_l) + \sum_{j \in F(x_t)} p(x_t/M_j)} \qquad (10)$$

where $M_l$ represents the acoustic model for phone l, $M_j$ represents the acoustic model for phone j, $C(x_t)$ represents a correct phone and $F(x_t)$ represents confusable phones.

10. The method of claim 5, wherein the second component of the two component discriminant measure is represented as:

$$P_i^l = \left[ \prod_{t \ni l \in F(x_t)} P_i^l(x_t) \right]^{\frac{1}{T_2}} \qquad (11)$$

where $x_t$ represents the feature vectors and $T_2$ represents a normalizing factor and where $P_i^l(x_t)$ is represented as:

$$P_i^l(x_t) = \sum_{t \ni l \in F(x_t)} \frac{p(x_t/M_l)}{p(x_t/M_{C(x_t)}) + \sum_{j \in F(x_t)} p(x_t/M_j)} \qquad (12)$$

where $M_l$ represents the acoustic model for phone l, $M_j$ represents the acoustic model for phone j, $C(x_t)$ represents a correct phone and $F(x_t)$ represents confusable phones.

11. The method of claim 5, wherein the adapting step further includes comparing the first component to a threshold value to determine whether the acoustic model of a phone is to be adapted.

12. The method of claim 5, wherein the adapting step further includes comparing the second component to a threshold value to determine whether the acoustic model of a phone is to be adapted.

13. The method of claim 5, wherein the adapting step further includes comparing a ratio of the first component to the second component to a threshold value to determine whether the acoustic model of a phone is to adapted.

14. The method of claim 5, wherein step (a) further includes selecting an acoustic model type, an acoustic model complexity and initial acoustic model parameters.

15. The method of claim 5, wherein the acoustic models are categorized as gaussian mixtures.

16. The method of claim 15, wherein step (a) further includes selecting a number of mixture components and means, variances and priors distributions of the mixture components.

17. The method of claim 16, wherein step (c) further includes one of increasing and decreasing the number of mixture components of the acoustic model depending on a comparison to at least one threshold value associated with the first and second components of the discriminant measure.

18. The method of claim 16, wherein the new acoustic model is kept if after increasing the number of mixture components the first component of the discriminant measure increases more than the second component of the discriminant measure.

19. The method of claim 16, wherein the new acoustic model is kept if after decreasing the number of mixture components the second component of the discriminant measure decreases more than the first component of the discriminant measure.

20. The method of claim 16, wherein step (f) further includes substantially optimizing the means, variances and priors distributions of the mixture components of the kept acoustic model.

21. The method of claim 16, wherein step (g) further includes comparing a median value of the first component of the discriminant measure to a termination threshold value and if the median value is greater than the termination threshold value then the parameters are considered to be substantially optimized, else repeat steps (b) through (g).

22. A program storage device readable by machine, tangibly embodying a program of instructions executable by the machine to perform method steps for performing acoustic model estimation in order to optimize classification accuracy on feature vectors derived from a speaker with respect to a plurality of classes corresponding to phones to which a plurality of acoustic models respectively correspond, the method comprising the steps of:

(a) initializing an acoustic model for each phone;

(b) evaluating the merit of the acoustic model initialized for each phone utilizing an objective function having a two component discriminant measure capable of characterizing each phone whereby a first component is defined as a probability that the acoustic model for the phone assigns to the feature vectors from the phone and a second component is defined as a probability that the acoustic model for the phone assigns to the feature vectors from other phones;

(c) adapting the acoustic model for selected phones so as to one of increase the first component of the discriminant measure for the phone and decrease the second component of the discriminant measure for the phone, the adapting step yielding a new acoustic model for each selected phone;

(d) evaluating the merit of the new acoustic models for each phone adapted in step (c) utilizing the two component discriminant measure;

(e) comparing results of the evaluation performed in step (b) with results of the evaluation of step (d) for each phone, and if one of the first component of the discriminant measure has increased and the second component of the discriminant measure has decreased, when the new acoustic model is kept for that phone, else the acoustic model originally initialized is kept;

(f) estimating parameters associated with each acoustic model kept for each phone in order to substantially optimize the objective function; and (g) evaluating termination criterion to determine if the parameters of the acoustic models are substantially optimized.

23. The program storage device of claim 22, further comprising the step of repeating steps (b) through (g) if the termination criterion has not been substantially satisfied.

* * * * *